Patented Oct. 6, 1931

1,826,467

UNITED STATES PATENT OFFICE

AENNE HARTENECK, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR THE ACTIVATION OF PROTEASES

No Drawing. Application filed July 8, 1929, Serial No. 376,865, and in Germany July 14, 1928.

The present invention relates to an improved process for the activation of proteases.

Vegetable proteases, for example ordinary commercial papain which is obtained from the fruit of Carica papaya, possess only a small proteolytic activity and generally speaking will not act on peptones and certain albuminoids. Thus for example the sericin cover of raw silk is not attacked. In order to degrade such albuminoids for example by means of papain, it is therefore necessary to add an activator to the papain. The only activators of this kind already known are hydrocyanic acid and sulphuretted hydrogen, both of which are unsuitable for many purposes in practice because on account of their poisonous nature troublesome precautions must be taken.

I have now found that an activation of vegetable proteases such for example as papain, is advantageously effected by an addition of an inorganic compound containing the sulphur thio-acid radicle, such as thiosulphuric acid or salts of the same, such as sodium thiosulphate or ammonium thiosulphate, or a tetrathionate which latter is however less active. The thio-sulphates have the advantage in contrast with hydrocyanic acid and sulphuretted hydrogen, that they are odorless, non-poisonous and fairly easy to manipulate. Papain, activated by means of thiosulphates, has a high proteolytic activity, and it is possible to degrade albuminoids which are unattacked by ordinary commercial papain. Thus raw silk, for example, is completely degummed in a short time in an acid medium by papain which has been activated by means of thiosulphate.

Moreover the coagulating properties of proteases are increased by additions of thio-acids, or salts thereof, for example sodium thiosulphate. Thus, for example, the coagulation of rubber latex by means of papain activated with thiosulphate takes place in about a quarter of the time necessary when employing ordinary commercial papain.

The following examples will further illustrate how the said invention may be carried out in practice, but the invention is not restricted to these examples.

Example 1

1 gram of sodium thiosulphate is added to a solution of 2 grams of commercial papain (Merck) in 50 cubic centimeters of water and 50 cubic centimeters of an $\frac{M}{5}$ solution of disodium citrate are added as a buffer solution. After 10 minutes a solution of 100 grams of gelatine in 1 liter of water is added and the conversion is allowed to proceed at from 40° to 50° C. After 4 hours a solution of a degradation product with an acid value (measured by titration with alcoholic potash) of 400 is obtained.

Example 2

0.1 gram of sodium thiosulphate and 5 cubic centimeters of $\frac{M}{5}$ disodium citrate solution are added to 5 cubic centimeters of fresh pineapple juice (containing the protease bromelin). After 10 minutes a solution of 10 grams of casein in 100 cubic centimeters of water is added and the whole kept at 40° C. After 4 hours a solution of a degradation product having an acid value (measured by titration with alcoholic potash) of 350 is obtained.

Example 3

100 grams of raw silk are treated for 1 hour at 60° C. with a solution of 5 grams of papain, 5 grams of sodium thiosulphate and 2 grams of primary ammonium phosphate in 3 liters of water. The silk is then removed from the bath and rinsed with a dilute solution of soap. After the treatment the gum is completely removed.

Example 4

10 liters of a practically neutral rubber latex are stirred with a solution of 5 grams of papain, 5 grams of sodium thiosulphate and 4 grams of primary ammonium phosphate in 200 cubic centimeters of water and kept for several hours at a temperature of 30° C. whereby a complete coagulation of the latex is obtained.

What I claim is:—

1. As new article of manufacture a vegetable protease activated by a water-soluble inorganic compound containing a thio-acid radicle.

2. As new article of manufacture a vegetable protease activated by a salt of a sulphur thio-acid selected from the group consisting of ammonium and alkali metal salts.

3. As new article of manufacture a vegetable protease activated by a thiosulphate belonging to the group consisting of ammonium and alkali metal salts of thiosulphuric acid.

4. As new article of manufacture an activated protease mixture comprising a vegetable protease and a water-soluble inorganic compound containing a sulphur thio-acid radicle.

5. As new article of manufacture an activated protease mixture comprising a vegetable protease and a salt of a sulphur thio-acid selected from the group consisting of ammonium and alkali metal salts.

6. As new article of manufacture an activated protease mixture comprising a vegetable protease and a thiosulphate belonging to the group consisting of ammonium and alkali metal salts of thiosulphuric acid.

7. As new article of manufacture an activated protease mixture comprising papain and a water-soluble inorganic compound containing a sulphur thio-acid radicle.

8. As new article of manufacture an activated protease mixture comprising papain and a salt of a sulphur thio-acid selected from the group consisting of ammonium and alkali metal salts.

9. As new article of manufacture an activated protease mixture comprising papain and a thiosulphate belonging to the group consisting of ammonium and alkali metal salts of thiosulphuric acid.

10. As new article of manufacture an activated protease mixture comprising papain and sodium thiosulphate.

In testimony whereof I have hereunto set my hand.

AENNE HARTENECK.